US011634142B2

(12) United States Patent
Pohl et al.

(10) Patent No.: US 11,634,142 B2
(45) Date of Patent: Apr. 25, 2023

(54) BLIND SPOT DETECTION

(71) Applicant: Intel Corporation, Santa Clara, CA (US)

(72) Inventors: Daniel Pohl, Puchheim (DE); Maik Sven Fox, Karlsruhe (DE)

(73) Assignee: INTEL CORPORATION, Santa Clara, CA (US)

(*) Notice: Subject to any disclaimer, the term of this patent is extended or adjusted under 35 U.S.C. 154(b) by 574 days.

(21) Appl. No.: 16/536,326

(22) Filed: Aug. 9, 2019

(65) Prior Publication Data

US 2019/0359218 A1 Nov. 28, 2019

(51) Int. Cl.
B60W 40/04 (2006.01)
G01S 13/93 (2020.01)
G08G 1/16 (2006.01)
G06K 9/00 (2022.01)
G01S 13/931 (2020.01)
G06V 20/58 (2022.01)

(52) U.S. Cl.
CPC .......... B60W 40/04 (2013.01); G01S 13/931 (2013.01); G06V 20/58 (2022.01); G06V 20/584 (2022.01); G08G 1/166 (2013.01); G01S 2013/9315 (2020.01)

(58) Field of Classification Search
CPC .. B60W 40/04; G01S 13/931; G06K 9/00805; G06K 9/00825; G08G 1/166
See application file for complete search history.

(56) References Cited

U.S. PATENT DOCUMENTS

| 6,501,536 | B1* | 12/2002 | Fredricks | B60R 1/02 180/271 |
| 10,591,919 | B1* | 3/2020 | Dolgov | B60W 30/16 |
| 2010/0017071 | A1* | 1/2010 | Ryu | B60R 1/02 701/49 |
| 2017/0305418 | A1* | 10/2017 | Bae | G08G 1/166 |
| 2018/0354508 | A1* | 12/2018 | Sim | B60W 30/18163 |
| 2019/0088138 | A1* | 3/2019 | Kang | B60W 40/04 |
| 2019/0315345 | A1* | 10/2019 | Newman | B60W 50/14 |

FOREIGN PATENT DOCUMENTS

| CN | 107487333 A | * | 12/2017 | ......... B60K 31/0008 |
| DE | 102017112567 A1 | * | 12/2017 | ......... B60K 31/0008 |

* cited by examiner

Primary Examiner — Peter D Nolan
Assistant Examiner — Demetra R Smith-Stewart
(74) Attorney, Agent, or Firm — Viering, Jentschura & Partner MBB

(57) ABSTRACT

Herein is disclosed a detection device comprising one or more sensors, configured to receive sensor input from a vicinity of a first vehicle, and to generate sensor data representing the received sensor input; one or more processors, configured to detect a second vehicle from the received sensor data; determine from the sensor data a region of a first type relative to the second vehicle and a region of a second type relative to the second vehicle; and control the first vehicle to avoid or reduce travel in the one or more regions of the first type or to travel from a region of the first type to a region of the second type.

20 Claims, 9 Drawing Sheets

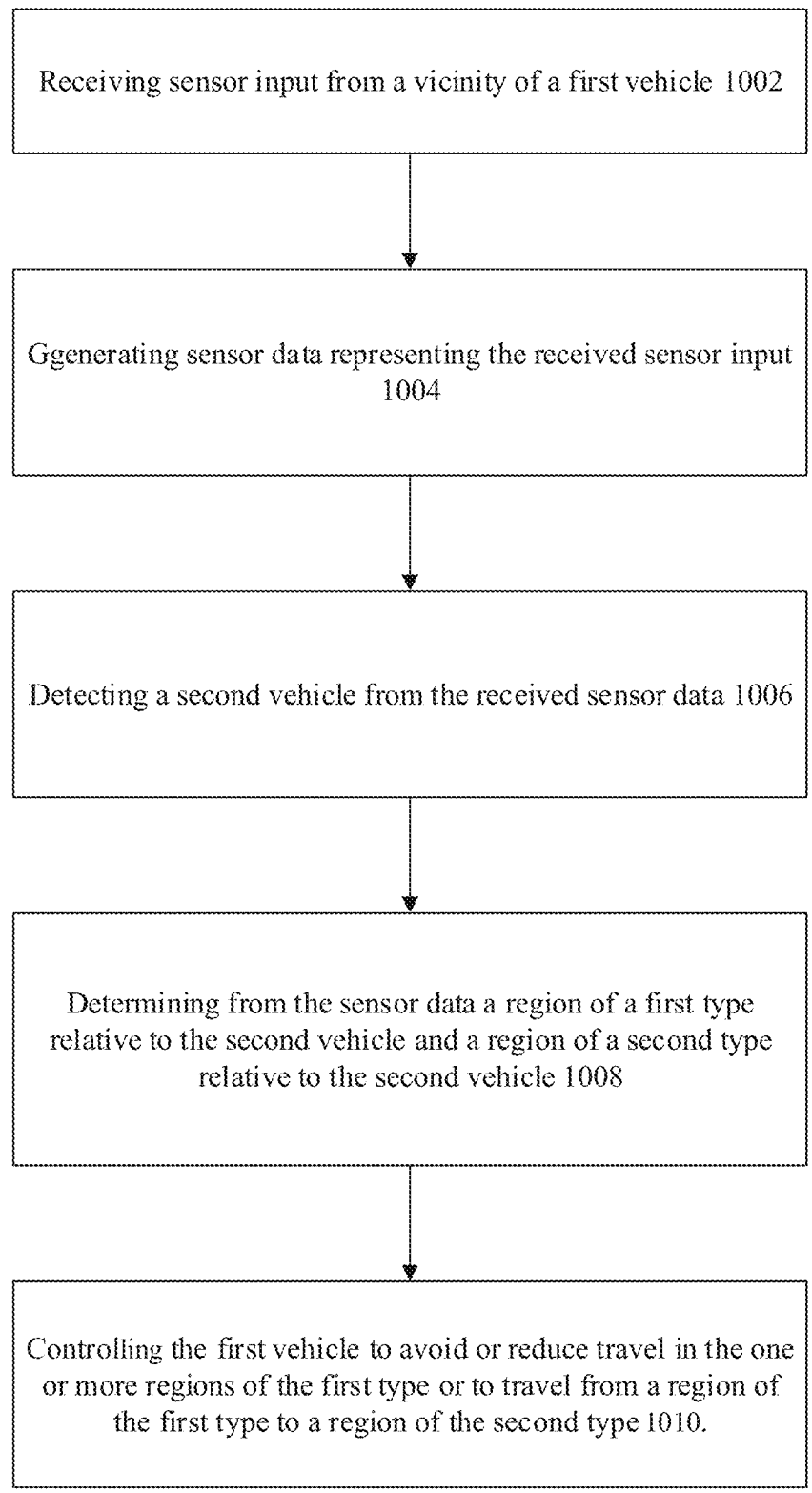

BLIND SPOT DETECTION

TECHNICAL FIELD

Exemplary implementations described herein generally relate to vehicle sensor information to detect in a first vehicle a blind spot of a second vehicle, and, as necessary, to control the first vehicle to evade or reduce time in the blind spot.

BACKGROUND

Owing to the design of vehicles and the reliance on mirrors to see certain regions behind and to the side of a vehicle, vehicles may have a blind spot, which may be an area in a vicinity of the vehicle in which the driver cannot directly visualize via the windshield, rear-view mirror, left side mirror, or right side mirror. A first vehicle entering or driving within a second vehicle's blind spot may be in increased danger due to the second vehicle having limited ability to see the first vehicle.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 10 depicts a receiving sensor input from a vicinity of a first vehicle.

DESCRIPTION

Figure 1:
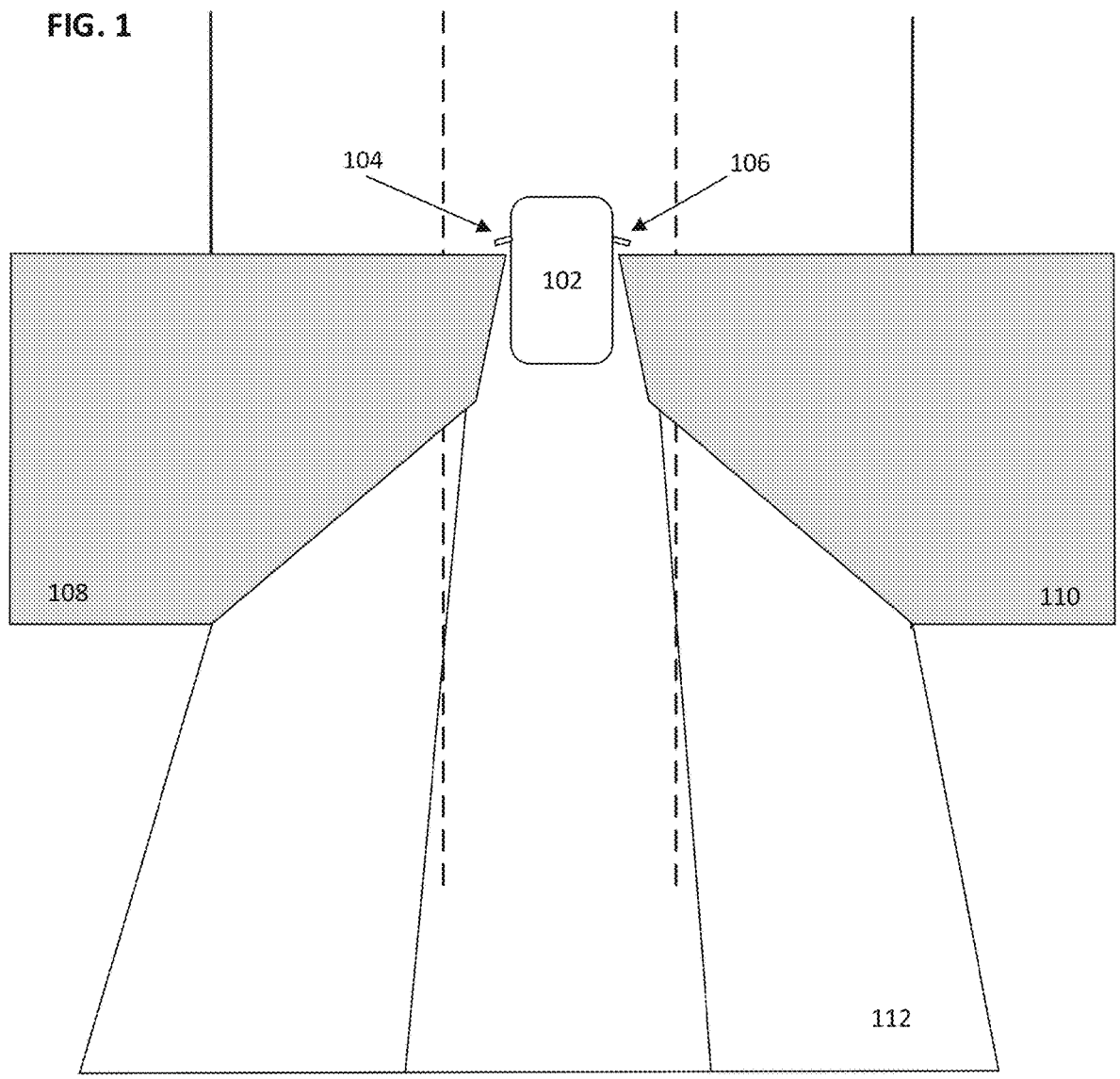
FIG. 1 depicts a vehicle and a physical configuration of the vehicle, along with neighboring regions of a first type and a second type.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Drivers use various mirrors, such as the left side mirror, the rear-view mirror, and the right side mirror to check the surroundings of the vehicle. Even with the mirrors, there is likely to be a blind spot in which a driver or a vehicle cannot see other vehicles through the mirrors. That is, the first vehicle may be unseeable to a second vehicle through the windshield of the second vehicle, the rear-view mirror of the second vehicle, the left side mirror of the second vehicle, or the right side mirror of the second vehicle. The first vehicle may only be visible to a driver of the second vehicle if the driver of the second vehicle rotates his/her head and visualizes the first vehicle through the side windows.

Many cars today are equipped with blind spot sensors, which provide a warning to a driver if another vehicle is in the driver's blind spot. That is, if a first vehicle is in a blind spot of a second vehicle, these blind spot sensors will provide the driver of the second vehicle with a warning that the first vehicle is in the second vehicle's blind spot. This can help drivers make a decision whether a lane change may be sensible. A driver of the second vehicle, attempting to determine whether to perform a lane change, for example, may not attempt the lane change if the driver is aware that another vehicle is in the driver's blind spot. At a minimum, the driver of the second vehicle may ensure that the driver rotates the driver's head sideways, such that the driver can visualize the existing blind spot. In this manner, collisions and/or injury may be avoided.

Although such existing blind spot warning systems may provide useful information and contribute to improve safety, not all vehicles are equipped with such a system. As such, and without such a system, the driver of the second vehicle may never become aware that another vehicle is in the driver's blind spot. Moreover, even if the second driver had a blind spot warning system, this system may not be activated under certain circumstances. For example, many blind spot warning systems first engage when the driver activates a turn signal. In such a system, if the second vehicle's driver does not activate the driver's turn signal, the blind spot warning system may not activate any thus may not warn the second vehicle's driver that the first vehicle is in the second vehicle's blind spot. From the perspective of surrounding drivers, such as the first driver in this example, the driver of the first vehicle may desire to know whether the first vehicle is in a blind spot of the second vehicle. Thus, it is described herein to alert the driver of a first vehicle when the first vehicle is in a blind spot of a second vehicle and/or likely to enter a blind spot of the second vehicle. It is further described, under some circumstances, to take action to avoid passing into or through the blind spot of the second vehicle.

According to one aspect of the disclosure, a lane assistant system is disclosed. The lane assistant system may detect the blind spots of other vehicles and attempt to avoid said blind spots or take action to reduce time in said blind spots.

The vehicle may be equipped with cameras or other sensors, which are capable of obtaining sensor information of a vicinity of the vehicle. These may include image sensors (i.e. cameras, lidar, etc.), ultrasonic sensors, radar, or otherwise. Many modern vehicles are manufactured with a variety of sensors that are able to obtain sensory information about a vicinity of the vehicle. Many, if not all, of the sensors could be used for the procedures, principles, and methods described herein, such that the received sensor data may be utilized to determine a blind spot of one or more other vehicles. For example, many modern vehicles are equipped with a 360° parking system, which relies heavily on a plurality of cameras placed at different angles relative to the vehicle. The sensor data from these cameras may be used for the blind spot detection procedures and principles described herein. Alternatively, a vehicle may be equipped with additional sensors, which are dedicated to the purpose of blind spot detection as described herein.

For clarity and consistency, the detection of blind spots will be described herein using at least a first vehicle and at least a second vehicle, wherein the first vehicle uses sensor data to calculate a blind spot from a driver's seat of the second vehicle. Using the sensor data, it may be determined where second vehicles are located relative to the first vehicle. Again, this may be performed using a variety of sensor data. For example, cameras may be used to receive image data of a vicinity of the first vehicle. In the event that a second vehicle is depicted in the image data, the second vehicle may be identified within the image data. Should a plurality of cameras from different vantages receive image data with the same vehicle, any number of photogrammetry techniques may be used to determine a depth information related to the second vehicle. That is, it can be determined from a plurality of images how far away the second vehicle is from the first vehicle. Furthermore, it can be determined from camera image data in which lane the second vehicle is relative to the first vehicle, and what if any maneuvers the second vehicle is attempting (i.e. lane changes, signaling, etc.).

Other sensor data may provide information about the second vehicle. For example, ultrasonic sensors may be utilized to determine a distance between the first vehicle and the second vehicle. Lidar image data may be utilized to determine a position and a distance of the second vehicle relative to the first vehicle. A person skilled in the art will appreciate how to use these sensor data to determine a relative distance and/or a relative position of the second vehicle with respect to the first vehicle.

According to one aspect of the disclosure, sensor information, or determinations relative to the second vehicle as derived from sensor information, may be shared from vehicle to vehicle. For example, such sensor information or determinations from sensor information may be shared via a V2V system, or any other suitable communication system. In this manner, determinations may be made by a vehicle near a second vehicle, and these determinations may be then shared with other vehicles that have not yet made such determinations or are too far away to make such determinations. In this manner, vehicles may be equipped with information about the blind spots of other vehicles that they have not yet encountered. Other sensor systems and data from others sourcing allowing localization of another vehicle can be used as well, e.g. to augment available data or make the position more robust (e.g. against environmental factors).

If the sensors are not able to measure velocity, distance, and/or relative position, the velocity can be estimated by using two consecutive measurements with a known time delta. Having established the relative position and approximate speed of one or more vehicles in the vicinity, each vehicle's zone can be classified. That is, it can be determined where a region corresponding to the vehicle's blind spot is located (referred to as region of a first type). The velocity may be used to determine whether the other vehicle is moving in the same direction as the instant vehicle.

Further classifications may be made by safety state. At least two safety states may be possible: yes and no, corresponding with safe and unsafe. The relevant question may be considered as whether the other vehicle's relative position can be considered safe when the instant vehicle is outside of the blind spot of the other vehicle. The exact safe/unsafe classification might depend on factors that can be detected by the sensor or be taken as a general assumption that holds true for the majority of vehicles on the road. For example, this determination could be made based on a length of the second vehicle; a classification of the second vehicle (car, truck, etc.); an approximate position of the rear view mirrors (e.g. 20% from front over length) or use sensor; an input (e.g. from camera) to gather exact mirror/driver positions; and/or an approximation/calculation of blind spot area of other vehicle.

The determination of safe or unsafe, as well as the determination of the region of the first type corresponding to the blind spots, may be made with a given safety margin. A safety margin may be predetermined or selected based any number of factors. For example, the safety margin may be a percentage which specifies an increase in the size of a presumed blind spot relative to a calculated blind spot. Conversely, the safety margin may be a percentage specifying a decrease in the size of a calculated safe area.

The procedure for detecting a blind spot and increasing safety relative to the detected blind spot may generally involve the following steps. First, a first vehicle may detect one or more second vehicles in a vicinity of the first vehicle. The first vehicle may determine a region of blind spot for the detected second vehicles. The first vehicle may classify the one or more second vehicles as being either safe or unsafe, based on the region of the blind spot corresponding to said second vehicle and a relative position of the first vehicle. If the first vehicle determines that a second vehicle is safe, the first vehicle may return to the procedure of detecting or checking the safety of other vehicles. If the first vehicle determines that a second vehicle is unsafe, the first vehicle may undertake an action depending on the any of a variety of variables. Such variables may include, but are not limited to, a velocity of the first vehicle, a velocity of the second vehicle, a position of the first vehicle relative to a position of the second vehicle, an acceleration of the first vehicle, an acceleration of the second vehicle, whether the first vehicle is in a blind spot of the second vehicle, whether the first vehicle and the second vehicle are in the same lane, and/or whether a path free of blind spots is available to exit or circumvent the blind spot of the second vehicle, etc. In the event that the second vehicle is determined to be unsafe, strategies for responding may include, but are not limited to, overtaking the second vehicle subject to traffic and traffic rules, decreasing velocity, increasing velocity, changing lanes if possible, waiting until safety issue resolves, taking no action, or otherwise.

By following the procedures described herein, time spent by a first vehicle in a blind spot of a second vehicle may be reduced, or it may be possible to avoid entering a blind spot of a second vehicle altogether.

FIG. 1 depicts a vehicle and a physical configuration of the vehicle, along with neighboring regions of a first type and a second-type. In this case, the vehicle 102 is equipped with two side mirrors, 104 and 106, respectively. The vehicle has two regions of a first type, indicated as a region of the first type on the left 108 and a region of the first type on the right 110. In a vicinity of the vehicle 102 there is also a region of the second type 112 (indicated as the non-shaded area). The regions of the first type 108 and 112 indicate a blind spot of the vehicle 102. This is an area that the driver of the vehicle 102 is unable to see through the front windshield, rearview mirror, left side mirror, or right side mirror. It may be possible for the driver of the vehicle 102 to view the regions of the first type 108 and 110 by rotating the driver's head or body to look directly out of the left side window or right side window; however, these areas are generally not visible to the driver by viewing the size of the vehicle only through the side mirrors. The regions indicated as a region of the second type 112 indicate an area that can be seen by the driver through the rearview mirror, left side mirror, right side mirror, or windshield.

Figure 2:
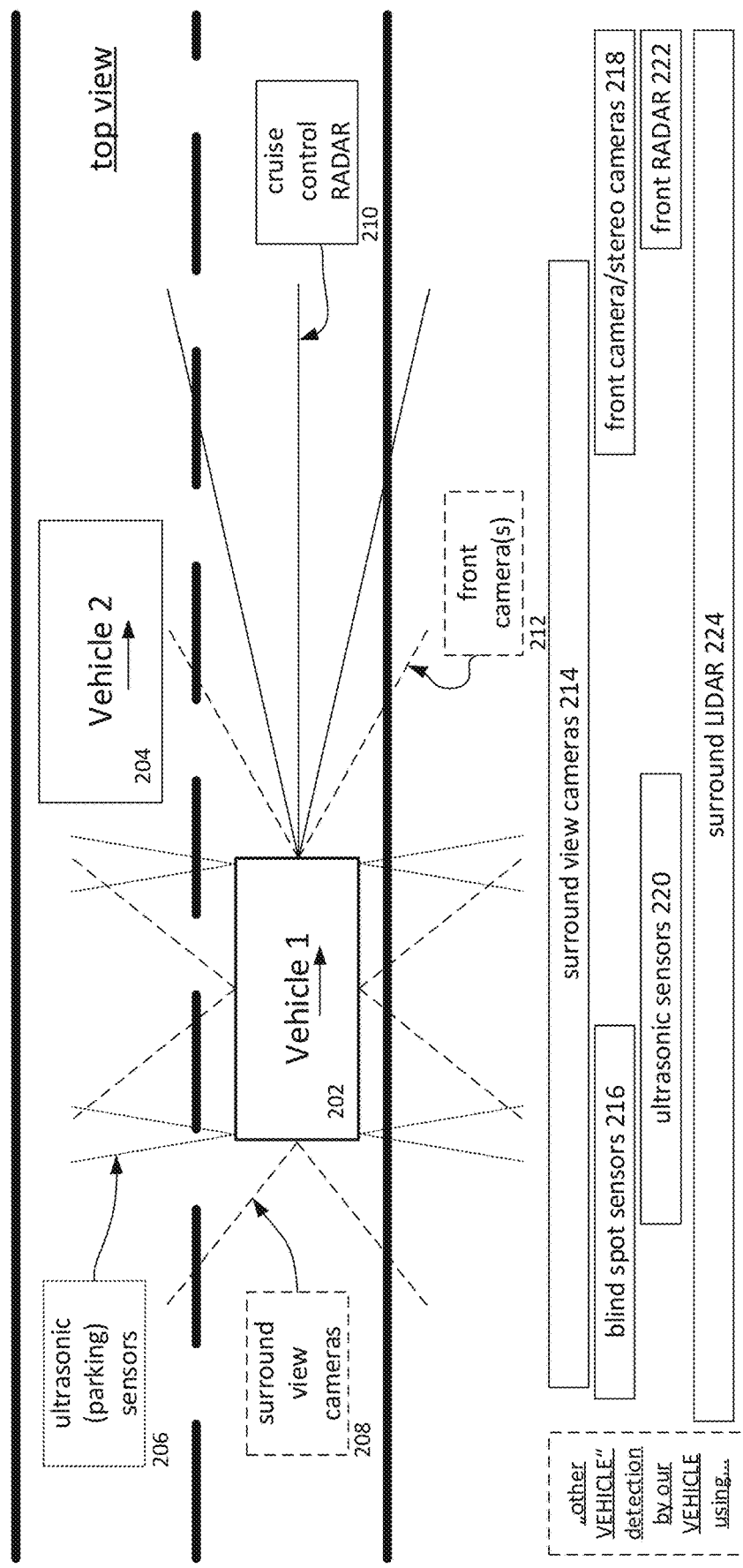
FIG. 2 depicts a first vehicle ascertaining blind spots of a second vehicle.

FIG. 2 depicts a first vehicle 202 ascertaining blind spots of a second vehicle 204. The first vehicle 202 is trailing behind the second vehicle 204 in a neighboring lane. The first vehicle is equipped with a variety of sensors including ultrasonic sensors 206, image sensors or surround view cameras 208, cruise control radar 210, front cameras 212, side surround view cameras 214, blind spot sensors 216, front cameras/stereo cameras 218, side ultrasonic sensors 220, and surround lidar sensors 224. The first vehicle may utilize any and/or any combination of the sensors to obtain information about the second vehicle 204. These sensors may be added to vehicle one 202 for the purpose of blind spot detection, or the sensors may be pre-existing sensors which are utilized by one or more additional systems, and the resulting sensor data from the sensors may also be utilized by the blind spot detection system described herein. In this manner, pre-existing systems may be at least doubly utilized and additional functionality gained therefrom.

Vehicle one 202 uses the sensors described above to gather information about vehicle two 204. Such information may include, but is not limited to, a position of vehicle two, a distance between vehicle two and vehicle one, a vector of vehicle two, a vector of vehicle two relative to vehicle one, a velocity of vehicle two, an acceleration of vehicle two, a relative velocity of vehicle two compared to vehicle one, and/or a relative acceleration of vehicle two compared to vehicle one. The sensor data may also be analyzed to determine one or more physical characteristics of vehicle two 204. For example, the sensor data may be analyzed by one or more processors to determine a carriage type of vehicle two (such as whether vehicle two is a car, a van, a Jeep, an SUV, a truck, a tractor-trailer, or otherwise). The sensor data may be analyzed to determine a position of one or more side mirrors on vehicle two 204. The side mirrors may be then assessed to determine a likely blind spot surrounding vehicle two 204. For example, it may be assumed that a blind spot begins laterally across an axis intersecting the mirrors (extending essentially perpendicularly to a side of the vehicle) and extending at a predetermined angle toward the rear of vehicle two. For example, the blind spot may be deemed to exist between the lateral line intersecting the mirrors and a 45° angle to that line, toward the rear of vehicle two. The angle used herein is given for demonstrative purposes only and should not be understood to be limiting. The angle used to estimate the blind spot may be selected upon any criteria desired including, but not limited to, a safety factor, a carriage type, a known blind spot area, or any other factor.

According to another aspect of the disclosure, the blind spots may be determined based on a make and/or a model of the vehicle. In this manner, the sensor data may be analyzed to determine a make or model of vehicle two 204. For example, image data corresponding to vehicle two 204 may be assessed for the name of the make, the name of the model, a body shape corresponding to the make or model, or any other physical characteristic that can identify a make or model of vehicle two 204. Vehicle one 202 may be configured with a memory containing a lookup table or other source of information which may provide blind spot data (corresponding to a region of the first type) based on a make and/or model of vehicle two 204. In this manner, upon determining a make and/or model of vehicle two 204, the data corresponding to the blind spots of vehicle two 204 may be applied to vehicle two and a calculation of a location of the blind spots may be obtained.

Any available data may be analyzed to perform the above steps. This data may include, but is not limited to, image sensor data such as data from one or more cameras, ultrasonic data radar data, lidar data, or any other data capable of being assessed to determine a physical characteristic, a location, a velocity, and acceleration, or otherwise of vehicle two 204.

Figure 3:
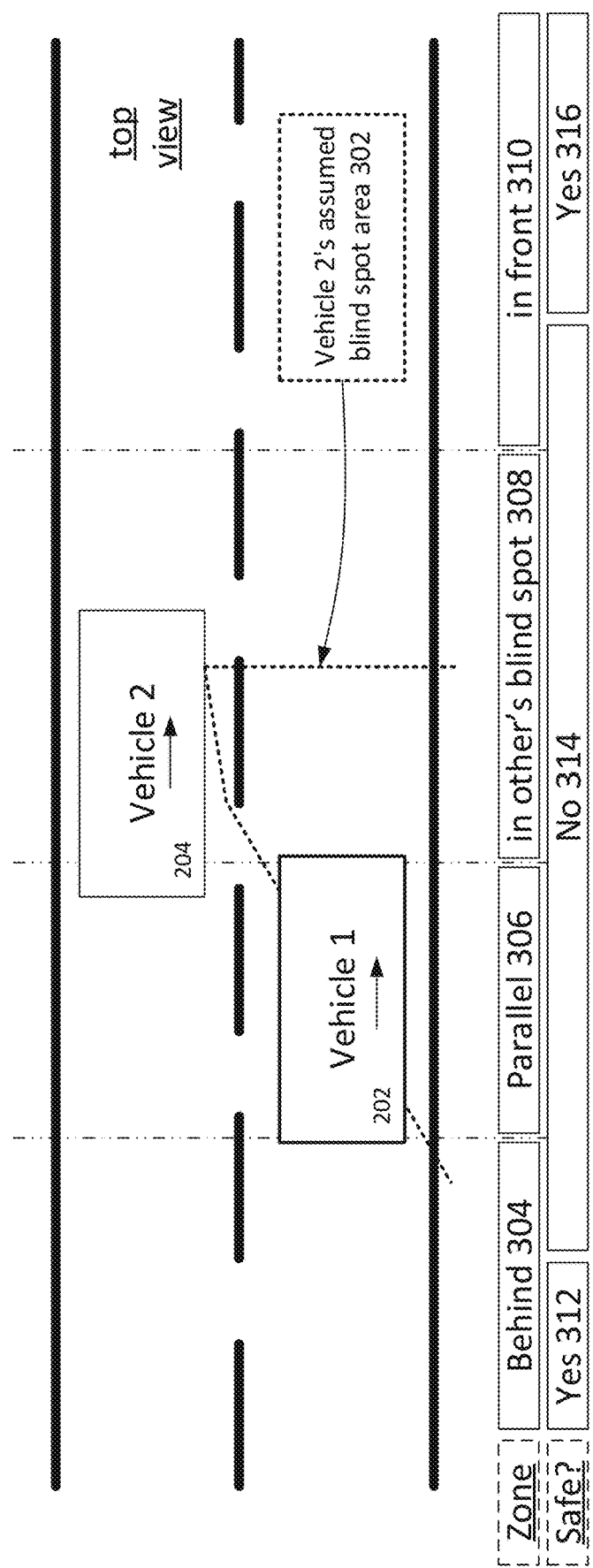
FIG. 3 shows a calculation of the blind spot of a second vehicle.

FIG. 3 shows a calculation of the blind spot of vehicle two. In this manner, vehicle one 202 is traveling behind and in an adjacent lane to vehicle two 204. Vehicle one is equipped with a variety of sensors (not pictured) which obtain information about vehicle two 204. In so doing, one or more processors of vehicle one analyzes the received sensor data and, in this case, detects a location of a side mirror of vehicle two 204. In this manner, and based on the location of the mirror, a blind spot 302 corresponding to vehicle two is assumed. This blind spot may extend laterally from vehicle two along the line essentially intersecting with a side mirror of vehicle two, and continues to cover a region extending toward the rear of vehicle two. In this case, it may be seen that the rear portion of the blind spot corresponding to vehicle two may not follow a straight line. Because the methods and procedures described herein provide a procedure for evaluating or assuming a blind spot, the region of the assumed blind spot may be configured based on any particular shaper specification desired.

Vehicle one 202 may be configured to allocate a vicinity of vehicle two 204 into a variety of zones as depicted herein. For example, vehicle one has divided its surrounding region into a zone to the rear of vehicle one 304 (behind), a zone to vehicle one 306 (parallel), a zone corresponding to a blind spot 308, and a zone in front of the blind spot 310. The zones may be assessed in terms of safety. In this case, vehicle one has assessed a portion of the rear zone 304 as being safe relative to the blind spot 312. Vehicle one 202 has assessed a portion of the rear zone 304, all of the parallel zone 306 all of the blind spot zone 308, and a portion of the front zone 310 to be a danger zone (or is not considered safe) based on the detected blind spot of vehicle two 204. When the first vehicle 204 has established sufficient distance from the blind spot, such as in a frontmost portion of the front zone 310, the region is again determine to be safe 316.

Figure 4:
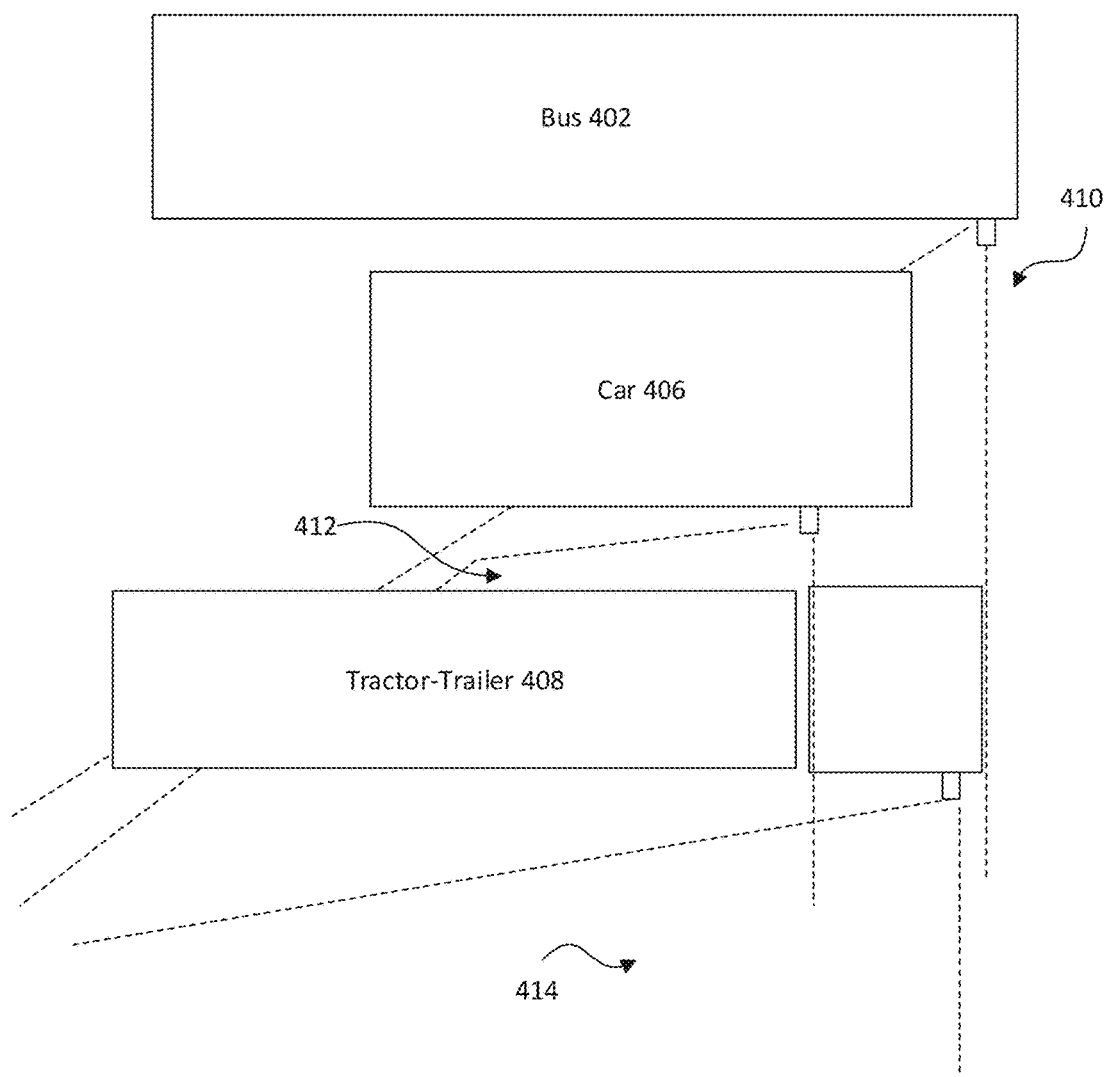
FIG. 4 depicts a determination of blind spots based on carriage type and/or mirror detection.

FIG. 4 depicts a determination of blind spots based on carriage type and/or mirror detection. In this manner, vehicle one detects neighboring vehicles that may be configured as a bus 402, a car 406, or tractor-trailer 408. The sensor data is analyzed to determine a mirror location of each of the vehicles. The mirrors are discovered and mapped to the carriage type as depicted herein. Mirror placement may differ with differing carriage types. For example, and as depicted herein, a mirror of a bus 402 may be placed very far toward the front of the vehicle. The mirror of a car 406 may be placed substantially farther back, such as approximately 20% from a front of the vehicle. The mirror of a tractor-trailer 408 may again be placed farther toward the front of the vehicle. The various carriages and mirror placement affect the resulting blind spot of the vehicle. For example, a blind spot of the bus may be essentially a 45° angle extending from the mirror location as depicted in 410. A blind spot of a car may extend sharply rearward at an initial angle much greater than 45°, but then decrease toward the rear of the car, as depicted in 412. A blind spot of the tractor-trailer may extend generally in a region greater than 45° from a line extending laterally from the side mirror (such as in a region denoted by a 60° angle, a 70° angle, and 80° angle, or otherwise). Although the exact shapes of the blind spots and the angles depicted and described herein for the blind spots relative to the carriage types are indicated for demonstrative purposes only, a determined carriage type and/or mirror placement may be used to estimate one or more blind spots as generally described herein.

Figure 5:
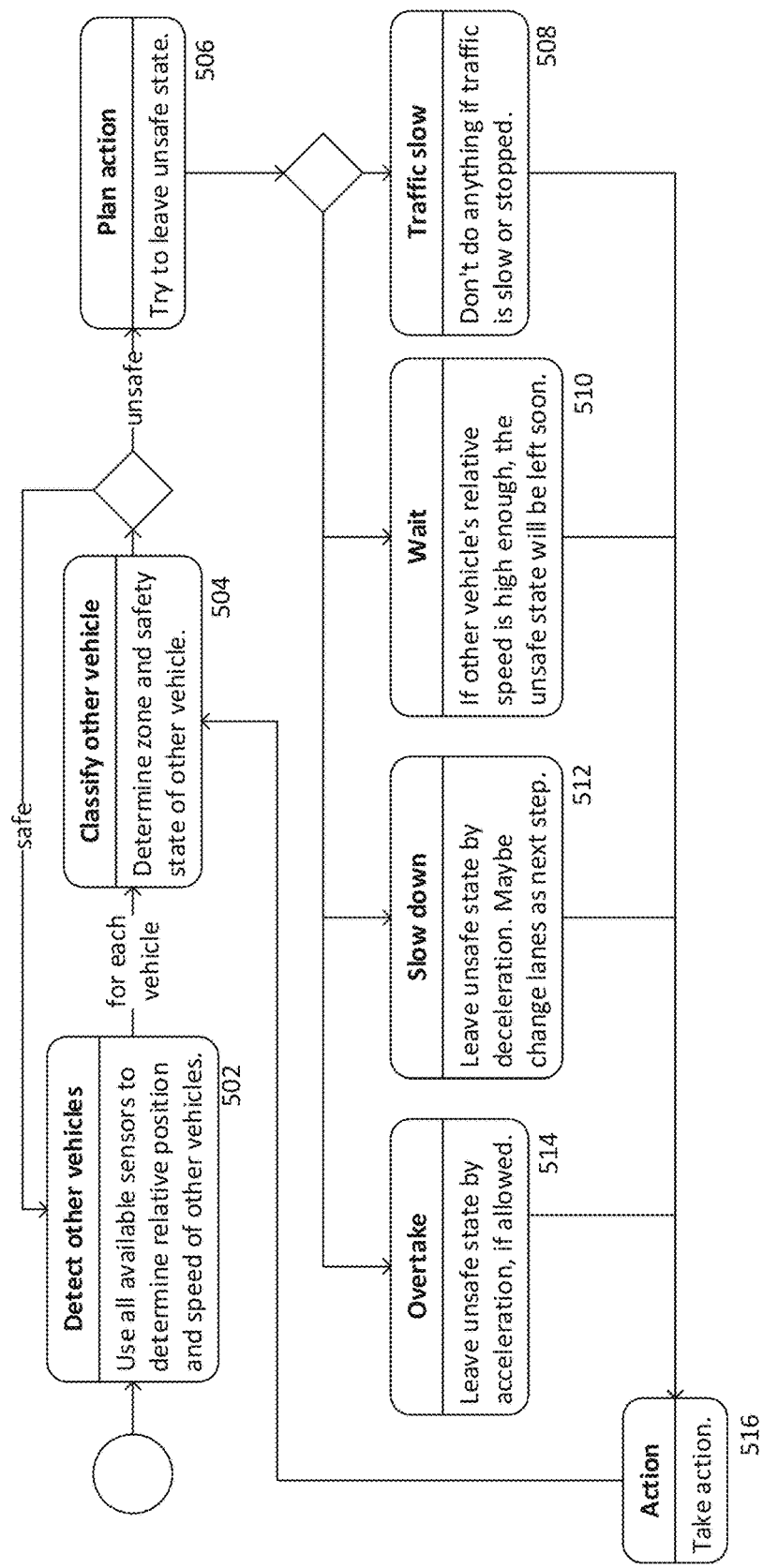
FIG. 5 depicts a procedure for blind spot estimation and vehicle control, according to an aspect of the disclosure.

FIG. 5 depicts a procedure for blind spot estimation and vehicle control, according to an aspect of the disclosure. In this case, sensor data is evaluated to detect vehicles in a vicinity of the first vehicle 502. Data from one or more sensors may be evaluated to determine relative positions, velocities, accelerations or otherwise of the one or more neighboring vehicles. For each detected vehicle, the sensor data may be evaluated to determine an estimated area of a blind spot relative to the vehicle and a safety state of the vehicle, such as whether the first vehicle is in a safe zone or a danger zone relative to the second vehicle 504. Assuming that the first vehicle is in a safe zone, the process may be repeated until a danger is encountered. Once the first vehicle determines that it is in a danger zone, the first vehicle may plan to take action relative to the danger zone 506. For example, the first vehicle may make plans to leave the danger zone. The planned action may be any of a variety of actions including, but not limited to, taking no action due to stopped or slowed traffic 508, taking no action due to a difference in the relative velocity and/or acceleration of the first vehicle and the second vehicle (such as when the distance between the first vehicle and the second vehicle will increase at the current velocity, and therefore the first vehicle will leave the danger zone without any further action) 510, decreasing velocity to leave the danger zone 512, or overtaking the second vehicle to leave the blind spot/danger zone 514. Once an action is determined, the first vehicle may take said action to reach a safe area 516.

Figure 6:
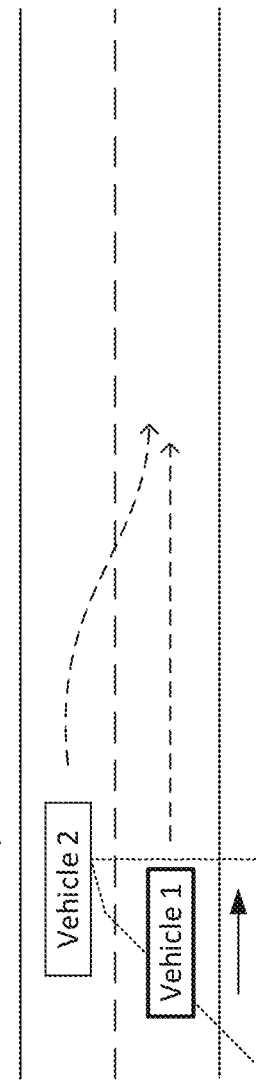
FIG. 6 depicts a first vehicle and a blind spot of the second vehicle.

FIG. 6 depicts a first vehicle and a blind spot of the second vehicle. It can be seen herein that the first vehicle is located within a blind spot of the second vehicle. In the regular course of travel, the driver of vehicle two may decide to switch lanes from the left lane to the right lane. Because vehicle one is in a blind spot of vehicle two, the driver of vehicle two will be unable to see vehicle one unless the driver of vehicle two rotates the driver's neck and/or torso to look out of the right window of vehicle two. If the driver of vehicle two merely looks through the right side mirror of vehicle two prior to initiating a lane change, the driver of vehicle two is unlikely to see vehicle one. This may result in the driver of vehicle two to control the vehicle to enter the right lane, where vehicle one is also present, which may result in a collision.

Figure 7:
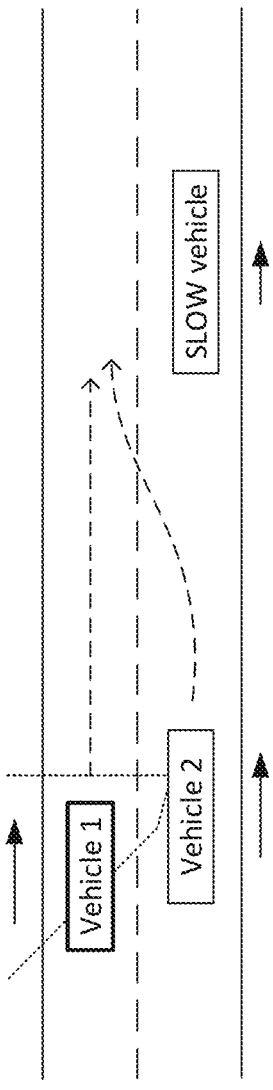
FIG. 7 depicts a first vehicle and a blind spot of a second vehicle according to another scenario.

FIG. 7 depicts a first vehicle and a blind spot of a second vehicle according to another scenario. In this case, the first vehicle is traveling in a left lane, and the second vehicle is traveling in a right lane. In front of the second vehicle is a third vehicle, which is moving slowly. Under this scenario, the driver of vehicle two may wish to change to the left lane, in order to pass the slow-moving third vehicle and avoid having to slow down. Vehicle one is in a blind spot of vehicle two, and therefore the driver of vehicle two will be unlikely to see vehicle one unless the driver of vehicle two rotates the driver's head and/or torso to view vehicle one through the left window. If the driver of vehicle two relies solely on images from the left side mirror, the driver of vehicle two will be unlikely to see vehicle one and may thus initiate a lane change into an area where vehicle one is already present.

Figure 8:
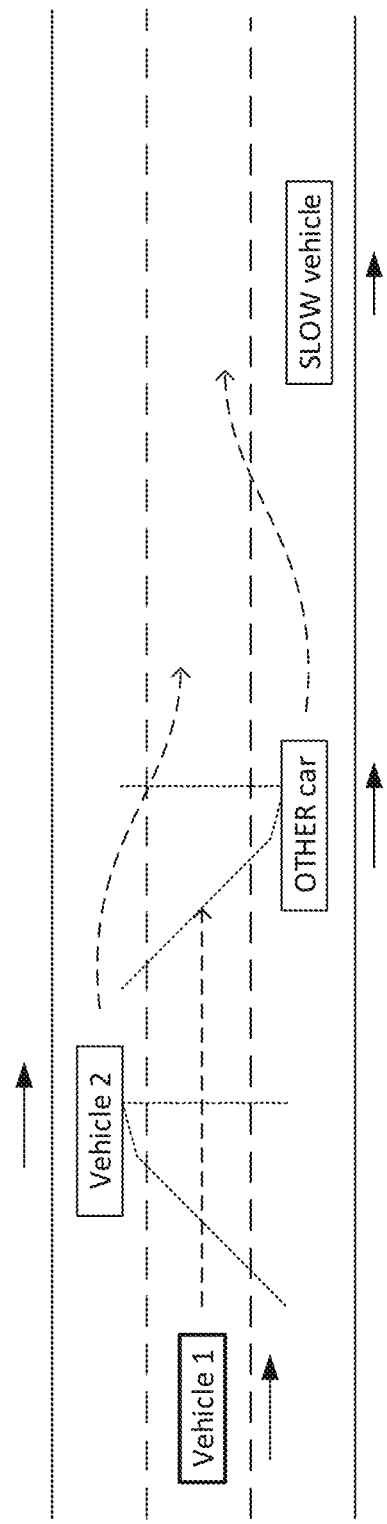
FIG. 8 depicts a first vehicle entering into a blind spot of the second vehicle, according to an aspect of the disclosure.

FIG. 8 depicts a first vehicle entering into a blind spot of the second vehicle, according to an aspect of the disclosure. In this case, vehicle one is traveling in an adjacent lane to vehicle two. Vehicle one is not in a blind spot of vehicle two. Nevertheless, in the event that vehicle one is traveling at a greater velocity than vehicle two, vehicle one is likely to enter the blind spot of vehicle two. If vehicle two decides to change lanes from the left lane to the center lane at a time when vehicle one is in the blind spot of vehicle two, vehicle two may attempt to enter the center lane in a location where vehicle one is already present. Moreover, the Other Car may attempt to move from the rightmost lane to the center lane based on a slow-moving vehicle in front. Depending on the velocities of vehicle one and vehicle two, either vehicle one and/or vehicle two may enter the blind spot of the Other Car, thereby increasing the likelihood that the "other car" may enter the center lane in an area where vehicle one and/or vehicle two is also present.

Figure 9:
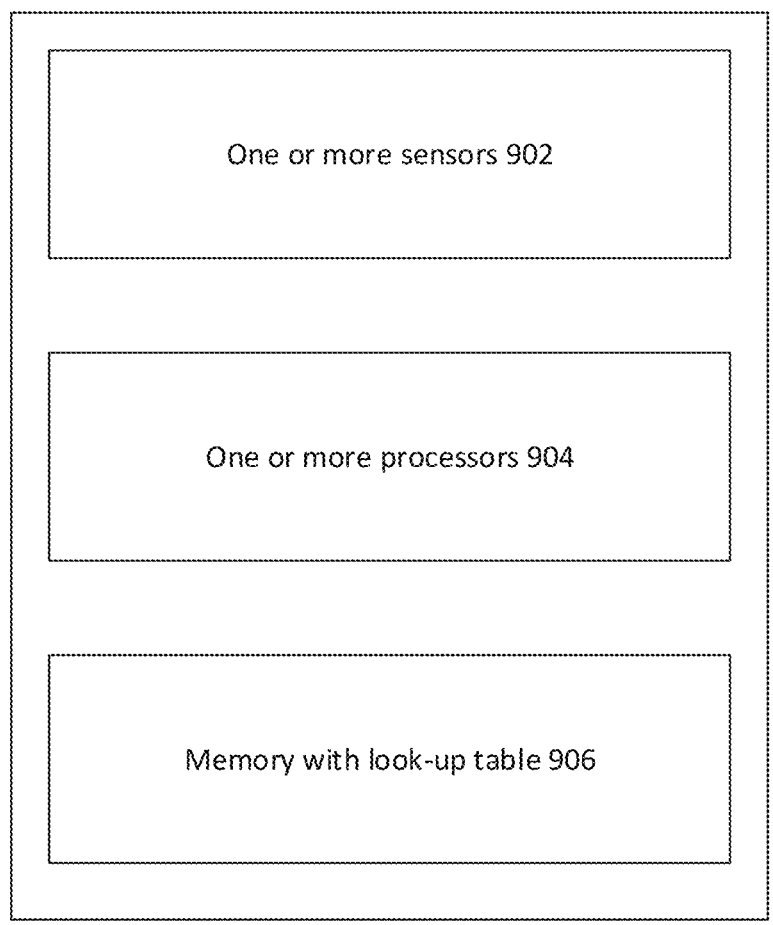
FIG. 9 depicts a blind spot detection device according to an aspect of the disclosure.

FIG. 9 depicts a blind spot detection device according to an aspect of the disclosure. The detection device may include one or more sensors 902, configured to receive sensor input from a vicinity of a first vehicle, and to generate sensor data representing the received sensor input; one or more processors 904, configured to determine from the sensor data a position of a second vehicle relative to the first vehicle; and a physical configuration of the second vehicle; to determine from at least the position of the second vehicle and the physical configuration of the second vehicle one or more regions of a first type in a vicinity of the second vehicle and one or more regions of a second type in a vicinity of the second vehicle; and to control the first vehicle to avoid or reduce a duration of time spent in the one or more regions of the first type or to travel from a region of the first type to a region of the second type. The device may further include one or more memories 906 which may contain a lookup table or other information which may be used to estimate a blind spot based on sensor data or information derivable from sensor data.

FIG. 10 depicts a method of blind spot detection including receiving sensor input from a vicinity of a first vehicle 1002; generating sensor data representing the received sensor input 1004; detecting a second vehicle from the received sensor data 1006; determining from the sensor data a region of a first type relative to the second vehicle and a region of a second type relative to the second vehicle 1008; and controlling the first vehicle to avoid or reduce travel in the one or more regions of the first type or to travel from a region of the first type to a region of the second type 1010.

The blind spot detection device may utilize data from one or more sensors. The one or more sensors may be any kind of sensors whatsoever that are capable of detecting information about a vehicle in a vicinity of the detector. These may include image sensors, lidar sensors, radar sensors, ultrasonic sensors, or otherwise. The one or more processors used to assess the sensor data for blind spot detection may be one or more processors otherwise used for one or more other systems or purposes in a vehicle, or one or more dedicated processors for blind spot detection.

The one or more processors may alternatively be one or more processors centrally located, or otherwise located outside of the vehicle performing the blind spot determination. In this manner, the vehicle blind spot determination (vehicle one) may obtain sensor information of vehicle two and may transmit some or all of the resulting sensor data to a third device containing one or more processors that process the data and return blind spot information to vehicle one. In this manner, the blind spot determination may be performed by a centralized processor, a processor in the cloud, or any other configuration.

The one or more processors may be configured to analyze sensor data to determine a position of the second vehicle. The position of the second vehicle is not limited to an absolute position relative to earth, but rather may be any position information such as, but not limited to, a position of the second vehicle relative to the first vehicle; a distance between the second vehicle and the first vehicle; a position of the second vehicle relative to the road, a lane, a landmark, or other object; a vector between the first vehicle and the second vehicle; or any other position information.

The physical configuration of the second vehicle may be broadly understood as any physical characteristic that can be used to provide information to estimate a blind spot of the second vehicle. This may include, but is not limited to, a carriage type of the second vehicle; a make of the second vehicle; a model of the second vehicle; a location of a side mirror of the second vehicle; a distance between the side mirror and a front of the second vehicle; a distance between a side mirror and a rear of the vehicle; a distance between the side mirror and a side panel of the second vehicle; a percentage of the total vehicle length between the front of the vehicle and the side mirror; a percentage of the total vehicle length between a rear of the vehicle and the side mirror; or otherwise.

Using the sensor data or information derivable from the sensor data, a region of a blind spot may be estimated. It is not necessary that the estimated blind spot correspond exactly to a true blind spot. It is acknowledged that a blind spot of the second vehicle may be at least somewhat influenced by factors which may either be non-determinable or may otherwise require such a significant burden to determine that it may be undesirable to assess such factors. These factors may include aspects such as a size of the driver; a position of the driver within the second vehicle; a position of the driver relative to the side mirror; a height of the driver relative to the side mirror; an angle of the side mirror; or any other factor. These factors may optionally be evaluated by the one or more processors based on the sensor data; however, these factors may also be omitted and estimation of the blind spot from the sensor data may ensue.

Based on the estimated blind spot, the first vehicle may determine a safety designation of a position of the first vehicle relative to the blind spot. For example, if the first vehicle is located within a blind spot of the second vehicle, safety designation may be determined as being unsafe. If the first vehicle is located outside of a blind spot of the second vehicle, the safety designation may be determined as being safe or unsafe, depending on other factors. For example, in the event that a velocity of the first vehicle is greater than the second vehicle, it may be possible that the first vehicle is outside of a blind spot of the second vehicle, but the first vehicle will be approaching a blind spot of the second vehicle. In this manner, the first vehicle may create a safety designation of unsafe based on an imminent entry into a blind spot of the second vehicle. Similarly, if the first vehicle is in a blind spot of the second vehicle, but a velocity of the first vehicle is significant different from the velocity of the second vehicle, the first vehicle may indicate its safety designation a safe based on an imminent leaving of the blind spot of the second vehicle.

Based on the blind spot as determined from the sensor information and/or based on the safety designation, the first vehicle may execute a plan or maneuver to increase safety. This plan or maneuver may include any number of actions including a change of velocity, a change of lanes, waiting, or taking no action at all. For example, in order to leave a blind spot of the second vehicle, to avoid entering a blind spot of the second vehicle, or to establish a greater distance between the first vehicle and a blind spot of the second vehicle, the first vehicle may change its velocity. The change in velocity may be an increase in velocity or a decrease in velocity. The change in velocity may be designed to increase a distance between the first vehicle and the second vehicle. The change in velocity may be designed to overtake the second vehicle and subsequently increase a distance between the first vehicle and the second vehicle.

The plan or maneuver may include changing of lanes. In this manner, the first vehicle may change lanes relative to the second vehicle. The change of lanes may be performed to exit a blind spot of the second vehicle, to increase a distance between the first vehicle and a blind spot of the second vehicle, to avoid entering the blind spot of the second vehicle or for any other purpose. The changing of lanes may be achieved for the purpose of overtaking the second vehicle.

The plan or maneuver may involve waiting before taking any action. This may be desirable, for instance, in the circumstances that the first vehicle and the second vehicle are traveling at different velocities. By maintaining different velocities, the distance between the first vehicle and the second vehicle will increase, which may lead to a greater distance between the first vehicle and a blind spot of the second vehicle.

The plan or maneuver may involve taking no action whatsoever. For example, in the event that vehicle one and vehicle two are stopped in traffic, or are moving slowly in traffic, it is possible that vehicle one may be in or very near a blind spot of vehicle two. However, in the event that both vehicles are stopped or moving slowly, there may be limited or no utility in causing vehicle one to move outside of the blind spot of vehicle two, or to otherwise increased distance from the blind spot of vehicle two.

As described herein, a velocity of the second vehicle may be determined by sensor data. This can be determined, for example, based on at least two data samples relative to a time delta. For example, various techniques are known for determining a distance of an object (in this case, the second vehicle) based on image data. This may be performed, for example, by the use of stereo cameras, or by various photogrammetry techniques. A distance between the first vehicle and the second vehicle may be determined in a first data sample and a second data sample within a known time difference between the first data sample and the second data sample. A difference in the distance between the first vehicle and the second vehicle over the time delta will result in a velocity of the second vehicle relative to the first vehicle. The blind spot detection procedures and system described herein may have access to the velocity of the first vehicle. This may be achieved through any means whatsoever including, but not limited to, speedometer or other sensor information of the first vehicle. The relative velocity of the second vehicle as described above may be added to the absolute velocity of the first vehicle to determine an absolute velocity of the second vehicle.

In a similar manner, the acceleration of the second vehicle may be determined. That is, the velocity of the second vehicle may be determined from at least two sample points, and any change in the velocity of the second vehicle over a known time delta will yield the acceleration of the second vehicle relative to the first vehicle. Similarly, the acceleration of the first vehicle may be calculated, and an acceleration of the first vehicle may be compared to an acceleration of the second vehicle relative to the first vehicle to determine an absolute acceleration of the second vehicle.

The one or more processors may be configured to assess sensor information to determine the presence of and/or a position of one or more side mirrors of the second vehicle. This may be achieved in any manner whatsoever including, but not limited to, image recognition to detect the side mirrors, image recognition to detect a make and/or model of the vehicle with a known placement of the side mirror relative to the core model of the vehicle (as derived, for example, from a lookup table), or from a derived a carriage type of the vehicle with a known general position of the side mirrors relative to another portion of the vehicle (for example, distance from the front, distance from the rear, or otherwise).

Any information regarding standard positions of mirrors, standard positions of blind spots, positions of mirrors or blind spots relative to any other feature of the vehicle, or any other data necessary to estimate blind spot positions from the available sensor data may be stored in a memory. The data may be configured in any manner whatsoever including, but not limited to, a lookup table.

Further, various embodiments will be described in the following.

In Example 1, a detection device is disclosed comprising one or more sensors, configured to receive sensor input from a vicinity of a first vehicle, and to generate sensor data representing the received sensor input; one or more processors, configured to detect a second vehicle from the received sensor data; determine from the sensor data one or more regions of a first type in a vicinity of the second vehicle and one or more regions of a second type in a vicinity of the second vehicle; and control the first vehicle to avoid or reduce travel in the one or more regions of the first type, or to travel from a region of the first type to a region of the second type.

In Example 2, the detection device of Example 1 is disclosed, wherein the one or more regions of the first type are blind spots of the second vehicle.

In Example 3, the detection device of Example 2 is disclosed, wherein the one or more blind spots are regions in a vicinity of the second vehicle that are not visible from a driver's seat of the second vehicle via any of a front windshield, a rear-view mirror, a left-side-mirror, or a right-side-mirror of the second vehicle.

In Example 4, the detection device of any one of Examples 1 to 3 is disclosed, wherein the one or more regions of the second type are regions in a vicinity of the second vehicle that are visible from a driver's seat of the second vehicle via any of a front windshield, a rear-view mirror, a left-side-mirror, or a right-side-mirror of the second vehicle.

In Example 5, the detection device of any one of Examples 1 to 4 is disclosed, wherein the one or more processors are further configured to detect from the sensor data a distance of the second vehicle relative to the first vehicle; and wherein the one or more processors are configured to control the first vehicle to avoid or reduce a duration of time spent in the one or more regions of the first type using the detected distance.

In Example 6, the detection device of any one of Examples 1 to 4 is disclosed, wherein the one or more processors are further configured to detect from the sensor data a velocity of the second vehicle relative to the first vehicle; and wherein the one or more processors are configured to control the first vehicle to avoid or reduce a duration of time spent in the one or more regions of the first type using the detected velocity.

In Example 7, the detection device of Example 6 is disclosed, wherein the one or more processors are configured to detect the velocity as a change in two or more detected positions of the second vehicle over a change in time.

In Example 8, the detection device of any one of Examples 1 to 7 is disclosed, wherein the one or more processors are further configured to detect from the sensor data an acceleration of the second vehicle relative to the first vehicle; and wherein the one or more processors are configured to control the first vehicle to avoid or reduce a duration of time spent in the one or more regions of the first type using the detected acceleration.

In Example 9, the detection device of Example 8 is disclosed, wherein the one or more processors are configured to determine the acceleration as a difference between two velocity determinations over a known time delta.

In Example 10, the detection device of any one of Examples 1 to 9 is disclosed, wherein the one or more processors are further configured to determine from the sensor data a position of a second vehicle relative to the first vehicle; and a physical configuration of the second vehicle, and wherein the one or more processors determine the region of the first type and the region of the second type using the position of the second vehicle and the physical configuration of the second vehicle.

In Example 11, the detection device of Example 10 is disclosed, wherein determining the configuration of the second vehicle comprises at least one of determining a position of at least one side mirror of the second vehicle relative to another detected element of the second vehicle; detecting a make of the second vehicle; detecting a model of the second vehicle; detecting a carriage type of the second vehicle; or any combination thereof.

In Example 12, the detection device of Example 11 is disclosed, further comprising a look-up table stored in a memory, the look-up table comprising at least one of locations of regions of the first type of a vehicle make; locations of regions of the first type of a vehicle model; locations of regions of the first type based on a mirror position; locations of regions of the first type based on a carriage type; or any combination thereof.

In Example 13, the detection device of any one of Examples 10 to 12 is disclosed, wherein determining the configuration of the second vehicle comprises determining a position of at least one side mirror of the second vehicle relative to another detected element of the second vehicle, and wherein determining one or more regions of the first type of the second vehicle comprises determining a region of the first type as a region between two angles extending from the detected at least one side mirror.

In Example 14, the detection device of any one of Examples 1 to 13 is disclosed, wherein the one or more sensors comprise at least one of an image sensor, an ultrasound sensor, a RADAR sensor, a LIDAR sensor, or any combination thereof.

In Example 15, the detection device of any one of Examples 1 to 14 is disclosed, wherein controlling the first vehicle to avoid or reduce a duration of time spent in the one or more regions of the first type comprises controlling the first vehicle to perform at least one of overtaking the second vehicle, decreasing a velocity of the first vehicle, or increasing a velocity of the first vehicle.

In Example 16, the detection device of any one of Examples 1 to 15 is disclosed, wherein controlling the first vehicle to avoid or reduce a duration of time spent in the one or more regions of the first type comprises determining a velocity of the second vehicle relative to the first vehicle, and if the velocity of the second vehicle is greater than the velocity of the first vehicle, controlling the first vehicle to maintain a current velocity.

In Example 17, the detection device of any one of Examples 1 to 16 is disclosed, wherein controlling the first vehicle to avoid or reduce a duration of time spent in the one or more regions of the first type comprises changing lanes.

In Example 18, the detection device of any one of Examples 1 to 18 is disclosed, wherein the one or more sensors comprise one or more image sensors, one or more ultrasonic sensors, one or more radar sensors, one or more lidar sensors, or any combination thereof.

In Example 19, a first vehicle is disclosed comprising: one or more sensors, configured to receive sensor input from a vicinity of the first vehicle, and to generate sensor data representing the received sensor input; one or more processors, configured to detect a second vehicle from the received sensor data; determine from the sensor data a region of a first type relative to the second vehicle and a region of a second type relative to the second vehicle; and control the first vehicle to avoid or reduce travel in the one or more regions of the first type or to travel from a region of the first type to a region of the second type.

In Example 20, the first vehicle of Example 19 is disclosed, wherein the one or more regions of the first type are blind spots of the second vehicle.

In Example 21, the first vehicle of Example 20 is disclosed, wherein the one or more blind spots are regions in a vicinity of the second vehicle that are not visible from a driver's seat of the second vehicle via any of a front windshield, a rear-view mirror, a left-side-mirror, or a right-side-mirror of the second vehicle.

In Example 22, the first vehicle of any one of Examples 19 to 21 is disclosed, wherein the one or more regions of the second type are regions in a vicinity of the second vehicle that are visible from a driver's seat of the second vehicle via any of a front windshield, a rear-view mirror, a left-side-mirror, or a right-side-mirror of the second vehicle.

In Example 23, the first vehicle of any one of Examples 19 to 22 is disclosed, wherein the one or more processors are further configured to detect from the sensor data a distance of the second vehicle relative to the first vehicle; and wherein the one or more processors are configured to control the first vehicle to avoid or reduce a duration of time spent in the one or more regions of the first type using the detected distance.

In Example 24, the first vehicle of any one of Examples 19 to 23 is disclosed, wherein the one or more processors are further configured to detect from the sensor data a velocity of the second vehicle relative to the first vehicle; and wherein the one or more processors are configured to control the first vehicle to avoid or reduce a duration of time spent in the one or more regions of the first type using the detected velocity.

In Example 25, the first vehicle of Example 24 is disclosed, wherein the one or more processors are configured to detect the velocity as a change in two or more detected positions of the second vehicle over a change in time.

In Example 26, the first vehicle of any one of Examples 19 to 25 is disclosed, wherein the one or more processors are further configured to detect from the sensor data an acceleration of the second vehicle relative to the first vehicle; and wherein the one or more processors are configured to control the first vehicle to avoid or reduce a duration of time spent in the one or more regions of the first type using the detected acceleration.

In Example 27, the first vehicle of Example 26 is disclosed, wherein the one or more processors are configured to determine the acceleration as a difference between two velocity determinations over a known time delta.

In Example 28, the first vehicle of any one of Examples 19 to 27 is disclosed, wherein the one or more processors are further configured to determine from the sensor data a position of a second vehicle relative to the first vehicle; and a physical configuration of the second vehicle, and wherein the one or more processors determine the region of the first type and the region of the second type using the position of the second vehicle and the physical configuration of the second vehicle.

In Example 29, the first vehicle of Example 28 is disclosed, wherein determining the configuration of the second vehicle comprises at least one of determining a position of at least one side mirror of the second vehicle relative to another detected element of the second vehicle; detecting a make of the second vehicle; detecting a model of the second vehicle; detecting a carriage type of the second vehicle; or any combination thereof.

In Example 30, the first vehicle of Example 29 is disclosed, further comprising a look-up table stored in a memory, the look-up table comprising at least one of locations of regions of the first type of a vehicle make; locations of regions of the first type of a vehicle model; locations of regions of the first type based on a mirror position; locations of regions of the first type based on a carriage type; or any combination thereof.

In Example 31, the first vehicle of any one of Examples 28 to 30 is disclosed, wherein determining the configuration of the second vehicle comprises determining a position of at least one side mirror of the second vehicle relative to another detected element of the second vehicle, and wherein determining one or more regions of the first type of the second vehicle comprises determining a region of the first type as a region between two angles extending from the detected at least one side mirror.

In Example 32, the first vehicle of any one of Examples 19 to 31 is disclosed, wherein the one or more sensors comprise at least one of an image sensor, an ultrasound sensor, a RADAR sensor, a LIDAR sensor, or any combination thereof.

In Example 33, the first vehicle of any one of Examples 19 to 32 is disclosed, wherein controlling the first vehicle to avoid or reduce a duration of time spent in the one or more regions of the first type comprises controlling the first vehicle to perform at least one of overtaking the second vehicle, decreasing a velocity of the first vehicle, or increasing a velocity of the first vehicle.

In Example 34, the first vehicle of any one of Examples 19 to 33 is disclosed, wherein controlling the first vehicle to avoid or reduce a duration of time spent in the one or more regions of the first type comprises determining a velocity of the second vehicle relative to the first vehicle, and if the velocity of the second vehicle is greater than the velocity of the first vehicle, controlling the first vehicle to maintain a current velocity.

In Example 35, the first vehicle of any one of Examples 19 to 34 is disclosed, wherein controlling the first vehicle to avoid or reduce a duration of time spent in the one or more regions of the first type comprises changing lanes.

In Example 36, the first vehicle of any one of Examples 19 to 35 is disclosed, wherein the one or more sensors comprise one or more image sensors, one or more ultrasonic sensors, one or more radar sensors, one or more lidar sensors, or any combination thereof.

In Example 37, a blind spot detection system is disclosed comprising: one or more sensors, configured to receive sensor input from a vicinity of a first vehicle, and to generate sensor data representing the received sensor input; one or more processors, configured to detect a second vehicle from the received sensor data; determine from the sensor data a region of a first type relative to the second vehicle and a region of a second type relative to the second vehicle; and control the first vehicle to avoid or reduce travel in the one or more regions of the first type or to travel from a region of the first type to a region of the second type.

In Example 38, the blind spot detection system of Example 37 is disclosed, wherein the one or more regions of the first type are blind spots of the second vehicle.

In Example 39, the blind spot detection system of Example 38 is disclosed, wherein the one or more blind spots are regions in a vicinity of the second vehicle that are not visible from a driver's seat of the second vehicle via any of a front windshield, a rear-view mirror, a left-side-mirror, or a right-side-mirror of the second vehicle.

In Example 40, the blind spot detection system of any one of Examples 37 to 39 is disclosed, wherein the one or more regions of the second type are regions in a vicinity of the second vehicle that are visible from a driver's seat of the second vehicle via any of a front windshield, a rear-view mirror, a left-side-mirror, or a right-side-mirror of the second vehicle.

In Example 41, the blind spot detection system of any one of Examples 37 to 40 is disclosed, wherein the one or more processors are further configured to detect from the sensor data a distance of the second vehicle relative to the first vehicle; and wherein the one or more processors are configured to control the first vehicle to avoid or reduce a duration of time spent in the one or more regions of the first type using the detected distance.

In Example 42, the blind spot detection system of any one of Examples 37 to 41 is disclosed, wherein the one or more processors are further configured to detect from the sensor data a velocity of the second vehicle relative to the first vehicle; and wherein the one or more processors are configured to control the first vehicle to avoid or reduce a duration of time spent in the one or more regions of the first type using the detected velocity.

In Example 43, the blind spot detection system of Example 42 is disclosed, wherein the one or more processors are configured to detect the velocity as a change in two or more detected positions of the second vehicle over a change in time.

In Example 44, the blind spot detection system of any one of Examples 37 to 43 is disclosed, wherein the one or more processors are further configured to detect from the sensor data an acceleration of the second vehicle relative to the first vehicle; and wherein the one or more processors are configured to control the first vehicle to avoid or reduce a duration of time spent in the one or more regions of the first type using the detected acceleration.

In Example 45, the blind spot detection system of Example 44 is disclosed, wherein the one or more processors are configured to determine the acceleration as a difference between two velocity determinations over a known time delta.

In Example 46, the blind spot detection system of any one of Examples 37 to 45 is disclosed, wherein the one or more processors are further configured to determine from the sensor data a position of a second vehicle relative to the first vehicle; and a physical configuration of the second vehicle, and wherein the one or more processors determine the region of the first type and the region of the second type using the position of the second vehicle and the physical configuration of the second vehicle.

In Example 47, the blind spot detection system of Example 46 is disclosed, wherein determining the configuration of the second vehicle comprises at least one of determining a position of at least one side mirror of the second vehicle relative to another detected element of the second vehicle; detecting a make of the second vehicle; detecting a model of the second vehicle; detecting a carriage type of the second vehicle; or any combination thereof.

In Example 48, the blind spot detection system of Example 47 is disclosed, further comprising a look-up table stored in a memory, the look-up table comprising at least one of locations of regions of the first type of a vehicle make; locations of regions of the first type of a vehicle model; locations of regions of the first type based on a mirror position; locations of regions of the first type based on a carriage type; or any combination thereof.

In Example 49, the blind spot detection system of any one of Examples 46 to 48 is disclosed, wherein determining the configuration of the second vehicle comprises determining a position of at least one side mirror of the second vehicle relative to another detected element of the second vehicle, and wherein determining one or more regions of the first type of the second vehicle comprises determining a region of the first type as a region between two angles extending from the detected at least one side mirror.

In Example 50, the blind spot detection system of any one of Examples 37 to 49 is disclosed, wherein the one or more sensors comprise at least one of an image sensor, an ultrasound sensor, a RADAR sensor, a LIDAR sensor, or any combination thereof.

In Example 51, the blind spot detection system of any one of Examples 37 to 50 is disclosed, wherein controlling the first vehicle to avoid or reduce a duration of time spent in the one or more regions of the first type comprises controlling the first vehicle to perform at least one of overtaking the second vehicle, decreasing a velocity of the first vehicle, or increasing a velocity of the first vehicle.

In Example 52, the blind spot detection system of any one of Examples 37 to 51 is disclosed, wherein controlling the first vehicle to avoid or reduce a duration of time spent in the one or more regions of the first type comprises determining a velocity of the second vehicle relative to the first vehicle, and if the velocity of the second vehicle is greater than the velocity of the first vehicle, controlling the first vehicle to maintain a current velocity.

In Example 53, the blind spot detection system of any one of Examples 37 to 52 is disclosed, wherein controlling the first vehicle to avoid or reduce a duration of time spent in the one or more regions of the first type comprises changing lanes.

In Example 54, the blind spot detection system of any one of Examples 37 to 53 is disclosed, wherein the one or more sensors comprise one or more image sensors, one or more ultrasonic sensors, one or more radar sensors, one or more lidar sensors, or any combination thereof.

In Example 55, a method of blind spot detection is disclosed comprising receiving sensor input from a vicinity of a first vehicle; generating sensor data representing the received sensor input; detecting a second vehicle from the received sensor data; determining from the sensor data a region of a first type relative to the second vehicle and a region of a second type relative to the second vehicle; and controlling the first vehicle to avoid or reduce travel in the one or more regions of the first type or to travel from a region of the first type to a region of the second type.

In Example 56, the method of blind spot detection of Example 55 is disclosed, wherein the one or more regions of the first type are blind spots of the second vehicle.

In Example 57, the method of blind spot detection of Example 56 is disclosed, wherein the one or more blind spots are regions in a vicinity of the second vehicle that are not visible from a driver's seat of the second vehicle via any of a front windshield, a rear-view mirror, a left-side-mirror, or a right-side-mirror of the second vehicle.

In Example 58, the method of blind spot detection of any one of Examples 55 to 57 is disclosed, wherein the one or more regions of the second type are regions in a vicinity of the second vehicle that are visible from a driver's seat of the second vehicle via any of a front windshield, a rear-view mirror, a left-side-mirror, or a right-side-mirror of the second vehicle.

In Example 59, the method of blind spot detection of any one of Examples 55 to 58 is disclosed, further comprising detecting from the sensor data a distance of the second vehicle relative to the first vehicle; and controlling the first vehicle to avoid or reduce a duration of time spent in the one or more regions of the first type using the detected distance.

In Example 60, the method of blind spot detection of any one of Examples 55 to 59 is disclosed, further comprising detecting from the sensor data a velocity of the second vehicle relative to the first vehicle; and controlling the first vehicle to avoid or reduce a duration of time spent in the one or more regions of the first type using the detected velocity.

In Example 61, the method of blind spot detection of Example 60 is disclosed, wherein the one or more processors are configured to detect the velocity as a change in two or more detected positions of the second vehicle over a change in time.

In Example 62, the method of blind spot detection of any one of Examples 55 to 61 is disclosed, further comprising detecting from the sensor data an acceleration of the second vehicle relative to the first vehicle; and controlling the first vehicle to avoid or reduce a duration of time spent in the one or more regions of the first type using the detected acceleration.

In Example 63, the method of blind spot detection of Example 62 is disclosed, further comprising determining the acceleration as a difference between two velocity determinations over a known time delta.

In Example 64, the method of blind spot detection of any one of Examples 55 to 63 is disclosed, further comprising determining from the sensor data a position of a second vehicle relative to the first vehicle; and a physical configuration of the second vehicle, and determining the region of the first type and the region of the second type using the position of the second vehicle and the physical configuration of the second vehicle.

In Example 65, the method of blind spot detection of Example 64 is disclosed, wherein determining the configuration of the second vehicle comprises at least one of determining a position of at least one side mirror of the second vehicle relative to another detected element of the second vehicle; detecting a make of the second vehicle; detecting a model of the second vehicle; detecting a carriage type of the second vehicle; or any combination thereof.

In Example 66, the method of blind spot detection of Example 65 is disclosed, further comprising a look-up table stored in a memory, the look-up table comprising at least one of locations of regions of the first type of a vehicle make; locations of regions of the first type of a vehicle model; locations of regions of the first type based on a mirror position; locations of regions of the first type based on a carriage type; or any combination thereof.

In Example 67, the method of blind spot detection of any one of Examples 64 to 66 is disclosed, wherein determining the configuration of the second vehicle comprises determining a position of at least one side mirror of the second vehicle relative to another detected element of the second vehicle, and wherein determining one or more regions of the first type of the second vehicle comprises determining a region of the first type as a region between two angles extending from the detected at least one side mirror.

In Example 68, the method of blind spot detection of any one of Examples 55 to 67 is disclosed, wherein controlling the first vehicle to avoid or reduce a duration of time spent in the one or more regions of the first type comprises controlling the first vehicle to perform at least one of overtaking the second vehicle, decreasing a velocity of the first vehicle, or increasing a velocity of the first vehicle.

In Example 69, the method of blind spot detection of any one of Examples 55 to 68 is disclosed, wherein controlling the first vehicle to avoid or reduce a duration of time spent in the one or more regions of the first type comprises determining a velocity of the second vehicle relative to the first vehicle, and if the velocity of the second vehicle is greater than the velocity of the first vehicle, controlling the first vehicle to maintain a current velocity.

In Example 70, the method of blind spot detection of any one of Examples 55 to 69 is disclosed, wherein controlling the first vehicle to avoid or reduce a duration of time spent in the one or more regions of the first type comprises changing lanes.

In Example 71, one or more non-transient computer readable media configured to cause one or more processors to perform the method of any one of Examples 55 to 70 are disclosed.

In Example 72, a detection device is disclosed comprising one or more sensors, configured to receive sensor input from a vicinity of a first vehicle, and to generate sensor data representing the received sensor input; one or more processors, configured to detect from the sensor data a second vehicle; and to determine from the sensor data a position of a second vehicle relative to the first vehicle; and a physical configuration of the second vehicle; to determine from at least the position of the second vehicle and the physical configuration of the second vehicle one or more regions of a first type in a vicinity of the second vehicle and one or more regions of a second type in a vicinity of the second vehicle; and to control the first vehicle to avoid or reduce a duration of time spent in the one or more regions of the first type or to travel from a region of the first type to a region of the second type.

In Example 73, a first vehicle is disclosed, comprising one or more sensors, configured to receive sensor input from a vicinity of a first vehicle, and to generate sensor data representing the received sensor input; one or more processors, configured to detect from the sensor data a second vehicle; and to determine from the sensor data a position of a second vehicle relative to the first vehicle; and a physical configuration of the second vehicle; to determine from at least the position of the second vehicle and the physical configuration of the second vehicle one or more regions of a first type in a vicinity of the second vehicle and one or more regions of a second type in a vicinity of the second vehicle; and to control the first vehicle to avoid or reduce a duration of time spent in the one or more regions of the first type or to travel from a region of the first type to a region of the second type.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A detection device comprising:
   one or more sensors, configured to receive sensor input from a vicinity of a first vehicle, and to generate sensor data representing the received sensor input;
   one or more processors, configured to
      detect a second vehicle from the received sensor data;
      determine from the sensor data one or more regions of a first type in a vicinity of the second vehicle and one or more regions of a second type in a vicinity of the second vehicle; and
      control the first vehicle to avoid or reduce travel in the one or more regions of the first type, or to travel from a region of the first type to a region of the second type;
   wherein the one or more regions of the first type are blind spots of the second vehicle;
   wherein the one or more processors are further configured to determine from the sensor data a position of a second vehicle relative to the first vehicle and a side mirror of the second vehicle; and wherein the one or more processors are configured to determine the region of the first type using the position of the second vehicle and a region between a first axis and a second axis, wherein the first axis intersects the detected side mirror and is perpendicular to a longitudinal axis of the second vehicle and the second axis intersects the first axis and extends at an angle from the first axis, toward a rear of the second vehicle.

2. The detection device of claim 1, wherein the one or more blind spots are regions in a vicinity of the second vehicle that are not visible from a driver's seat of the second vehicle via any of a front windshield, a rear-view mirror, a left-side-mirror, or a right-side-mirror of the second vehicle.

3. The detection device of claim 1, wherein the one or more regions of the second type are regions in a vicinity of the second vehicle that are visible from a driver's seat of the second vehicle via any of a front windshield, a rear-view mirror, a left-side-mirror, or a right-side-mirror of the second vehicle.

4. The detection device of claim 1, wherein the one or more processors are further configured to detect from the sensor data a distance of the second vehicle relative to the first vehicle; and wherein the one or more processors are configured to control the first vehicle to avoid or reduce a duration of time spent in the one or more regions of the first type using the detected distance.

5. The detection device of claim 1, further comprising a look-up table stored in a memory, the look-up table comprising at least one of locations of regions of the first type of a vehicle make; locations of regions of the first type of a vehicle model; locations of regions of the first type based on a mirror position; locations of regions of the first type based on a carriage type; or any combination thereof.

6. The detection device of claim 1, wherein determining the position of at least one side mirror of the second vehicle relative to another detected element of the second vehicle comprises determining a position of two side mirrors and determining the one or more regions of the first type as one or more regions along an axis extending at a predetermined angle away from an axis intersecting the two side mirrors.

7. The detection device of claim 1, wherein the one or more processors are further configured to detect from the sensor data a velocity of the second vehicle relative to the first vehicle; and wherein the one or more processors are configured to control the first vehicle to avoid or reduce a duration of time spent in the one or more regions of the first type using the detected velocity.

8. The detection device of claim 7, wherein the one or more processors are configured to detect the velocity as a change in two or more detected positions of the second vehicle over a change in time.

9. The detection device of claim 1, wherein the one or more processors are further configured to detect from the sensor data an acceleration of the second vehicle relative to the first vehicle; and wherein the one or more processors are configured to control the first vehicle to avoid or reduce a duration of time spent in the one or more regions of the first type using the detected acceleration.

10. The detection device of claim 1, wherein the one or more processors are further configured to determine from the sensor data a position of a second vehicle relative to the first vehicle; and a physical configuration of the second vehicle, and wherein the one or more processors determine the region of the first type and the region of the second type using the position of the second vehicle and the physical configuration of the second vehicle.

11. The detection device of claim 1, wherein the one or more processors are further configured to controlling the first vehicle to avoid or reduce a duration of time spent in the one or more regions of the first type.

12. A blind spot detection system comprising:
   one or more sensors, configured to receive sensor input from a vicinity of a first vehicle, and to generate sensor data representing the received sensor input;
   one or more processors, configured to
      detect a second vehicle from the received sensor data;
      determine from the sensor data a region of a first type relative to the second vehicle and a region of a second type relative to the second vehicle; and
      control the first vehicle to avoid or reduce travel in the one or more regions of the first type or to travel from a region of the first type to a region of the second type;
   wherein the one or more processors are further configured to detect from the sensor data an acceleration of the second vehicle relative to the first vehicle; and wherein the one or more processors are configured to control the first vehicle to avoid or reduce a duration of time spent in the one or more regions of the first type using the detected acceleration;
   wherein the one or more processors are further configured to determine from the sensor data a position of a second vehicle relative to the first vehicle; and a physical configuration of the second vehicle, and wherein the one or more processors determine the region of the first type and the region of the second type using the position of the second vehicle and the physical configuration of the second vehicle;
   wherein determining the configuration of the second vehicle comprises at least one of determining a position of at least one side mirror of the second vehicle relative to another detected element of the second vehicle; detecting a make of the second vehicle; detecting a model of the second vehicle; detecting a carriage type of the second vehicle; or any combination thereof.

13. The blind spot detection system of claim 12, wherein the one or more regions of the first type are blind spots of the second vehicle.

14. The blind spot detection system of claim 12, wherein the one or more blind spots are regions in a vicinity of the second vehicle that are not visible from a driver's seat of the second vehicle via any of a front windshield, a rear-view mirror, a left-side-mirror, or a right-side-mirror of the second vehicle.

15. The blind spot detection system of claim 12, wherein the one or more regions of the second type are regions in a vicinity of the second vehicle that are visible from a driver's seat of the second vehicle via any of a front windshield, a rear-view mirror, a left-side-mirror, or a right-side-mirror of the second vehicle.

16. The blind spot detection system of claim 12, wherein the one or more processors are further configured to detect from the sensor data a distance of the second vehicle relative to the first vehicle; and wherein the one or more processors are configured to control the first vehicle to avoid or reduce a duration of time spent in the one or more regions of the first type using the detected distance.

17. A method of blind spot detection comprising:
receiving sensor input from a vicinity of a first vehicle;
generating sensor data representing the received sensor input;
detecting a second vehicle from the received sensor data;
determining from the sensor data a region of a first type relative to the second vehicle and a region of a second type relative to the second vehicle; and
controlling the first vehicle to avoid or reduce travel in the one or more regions of the first type or to travel from a region of the first type to a region of the second type;
further comprising determining from the sensor data a position of a second vehicle relative to the first vehicle and a side mirror of the second vehicle; and wherein determining the region of the first type comprises using the position of the second vehicle and
a region between a first axis and a second axis, wherein the first axis intersects the detected side mirror and is perpendicular to a longitudinal axis of the second vehicle and the second axis intersects the first axis and extends at an angle from the first axis, toward a rear of the second vehicle.

18. The method of blind spot detection of claim 17, further comprising detecting from the sensor data a distance of the second vehicle relative to the first vehicle; and controlling the first vehicle to avoid or reduce a duration of time spent in the one or more regions of the first type using the detected distance.

19. The method of blind spot detection of claim 17, further comprising detecting from the sensor data a velocity of the second vehicle relative to the first vehicle;
and controlling the first vehicle to avoid or reduce a duration of time spent in the one or more regions of the first type using the detected velocity.

20. The method of claim 17, wherein determining the position of at least one side mirror of the second vehicle relative to another detected element of the second vehicle comprises determining a position of two side mirrors and determining the one or more regions of the first type as one or more regions along an axis extending at a predetermined angle away from an axis intersecting the two side mirrors.

* * * * *